United States Patent [19]

Sciggs et al.

[11] Patent Number: 4,811,150
[45] Date of Patent: Mar. 7, 1989

[54] DEVICE TO REPLACE SAFETY TAB IN VHS FORMAT VIDEO TAPES

[76] Inventors: Victor S. Sciggs; Susan M. Sciggs, both of 612 N. Alisos St., Santa Barbara, Calif. 93103

[21] Appl. No.: 126,722

[22] Filed: Nov. 30, 1987

[51] Int. Cl.$^4$ .................. G11B 23/02; G11B 15/04
[52] U.S. Cl. .................................. 360/132; 360/60
[58] Field of Search .......................... 360/132, 60; 242/197–199

[56] References Cited

U.S. PATENT DOCUMENTS

| | | | |
|---|---|---|---|
| 276,911 | 5/1884 | Schmidt | D14/11 |
| 3,848,265 | 11/1974 | Biery et al. | 360/132 |
| 4,044,386 | 8/1977 | Satou et al. | 360/60 |
| 4,380,030 | 4/1983 | Shiba | 360/132 |
| 4,665,456 | 5/1987 | Ahlberg | 360/132 |

Primary Examiner—A. J. Heinz

[57] ABSTRACT

This device relates to video recorders and in particular, to a device for replacing a previously removed record saftey tab. This two-piece device provides a safe, simple, and secure means of re-recording over a tape, and will remain in place on the cassette. One piece is permanently attached to the inner rear wall of the cavity and the second (which is removable) mates to the first. They are color coded for easy recognition and will not interfere with the normal operation of the VCR.

4 Claims, 4 Drawing Sheets

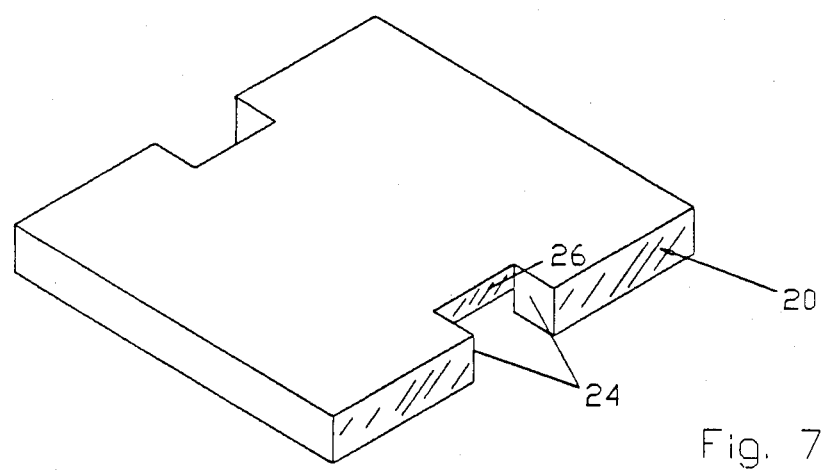
Fig. 7
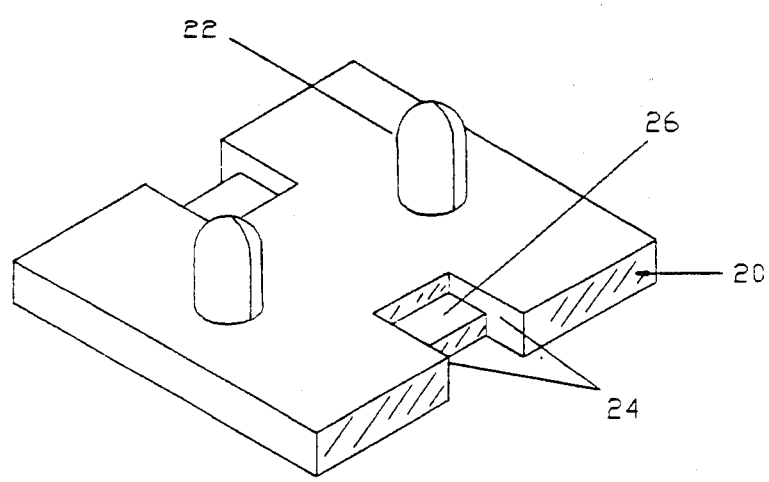
Fig. 8
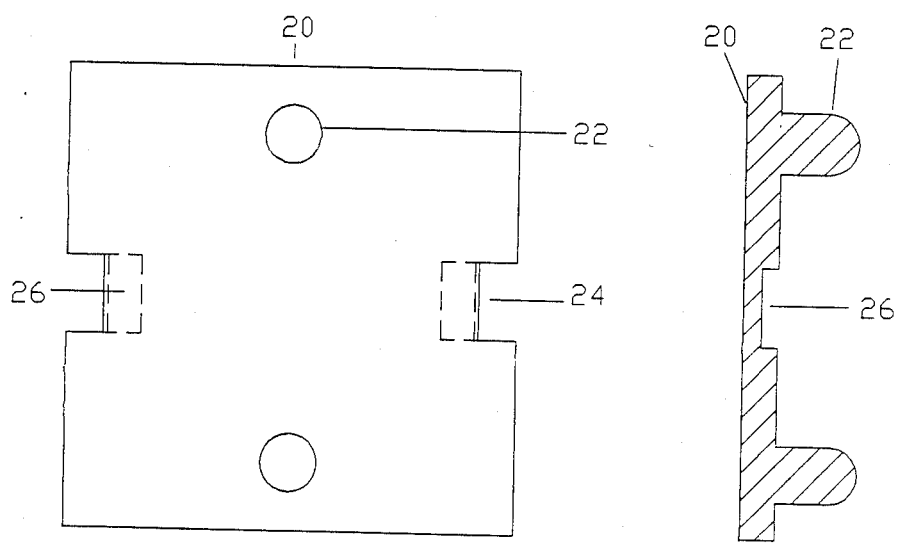
Fig. 9a
Fig. 9b

DEVICE TO REPLACE SAFETY TAB IN VHS FORMAT VIDEO TAPES

BACKGROUND

1. Field of Invention

This invention relates to video tape cassettes, VHS format in particular. The device will allow users to re-record over VHS video tapes that have had the protective safety tab removed.

Background

2. Description of Prior Art 8 mm format video cassettes have a sliding window that is used to block recording and/or to allow recording depending on the position of the window. Also found through a patent search, U.S. Pat. No.: Des. 276,911, Date of Patent: Dec. 25, 1984, a device that is called Adapter to Permit Recording on a Cassette. This could not be used for VHS format video tape cassettes because of its' shape.

VHS video tape recorder manufacturers state that: "To prevent accidental erasure of recorded material remove the safety tab from the rear of the cassette"[1]. The Manufacturer further states that: "To record on a cassette that has had the tab removed, simply cover safety tab hole with vinyl tape . . . ". We have found through our own experience, and by conversations with others, that the suggested method of putting vinyl tape over the cavity where the safety tab was previously, was not always satisfactory. The tape could, after time, sag slightly and cause the sensing switch to block any recording attempt by the user. Further, it is very possible for the tape to come off in the machine possibly causing damage to the mechanism, and a costly repair bill to the owner.

[1] RCA Operating Instructions for VJT-400 VHS Video Cassette Recorder.

Most VHS format owners would therefore find it desirable to have a device that could be used many times, that would facilitate the recording or the blocking of a recording more positively, with greater ease, and provide a neat, clean appearance.

OBJECTS AND ADVANTAGES

Accordingly we claim the following as our objects and advantages of the invention: to provide a device that would allow users of VHS video tapes to be able to remove the saety tab and replace it with a unit tha would allow re-recording with great ease. The device would also be, (because it uses two different colored parts), a useful indicator of whether or not a tape was ready to be recorded on, or if it was record-protected. It would be easily and quickly removed with a pointed object such as a nailfile or with simple tool (42) and could be used almost infinitely. It would help eliminate the problems associated with putting vinyl adhesive tape over the cavity (36), such a stretching, the difficulty of removal and the adhesive glue residue that is left by the adhesive tape on the cassette housing.

There is a need for this invention, because as aforementioned, the manufacturers of video tape found it important enough to incorporate the principle in the design of 8 mm cassettes with the sliding tab or "window". In the question and answer column "Fine Tuning" of VIDEO magazine (under the sub-title "Jam Sandwich" in the December 1986 issue) a reader wrote in to tell of a problem he had with using tape on a cassette, saying that the adhesive tape jammed the cassette from going in the machine because it was a bit too thick. The author of the column apparently knew of nothing other Avery labels to use in place of the tape.

Readers will find further objects and advantages of the invention from consideration of the ensuing description and the accompanying drawings.

DRAWING FIGURES

FIG. 7 shows an top isometric view of the male (removable) part with slots for its removal.

FIG. 8 shows a bottom isometric view of the male (removable) part with cylindrical members.

FIGS. 9a and 9b show the male (removable) part in both a top and side sectional view.

Figure 1:
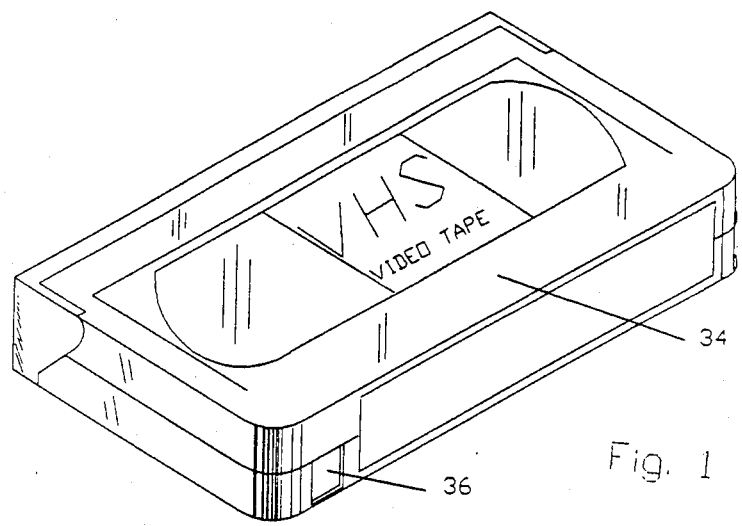
FIG. 1 shows an isometric view of the VHS format video tape cassette housing, showing the cavity in which the safety tab has been removed.
Figure 2:
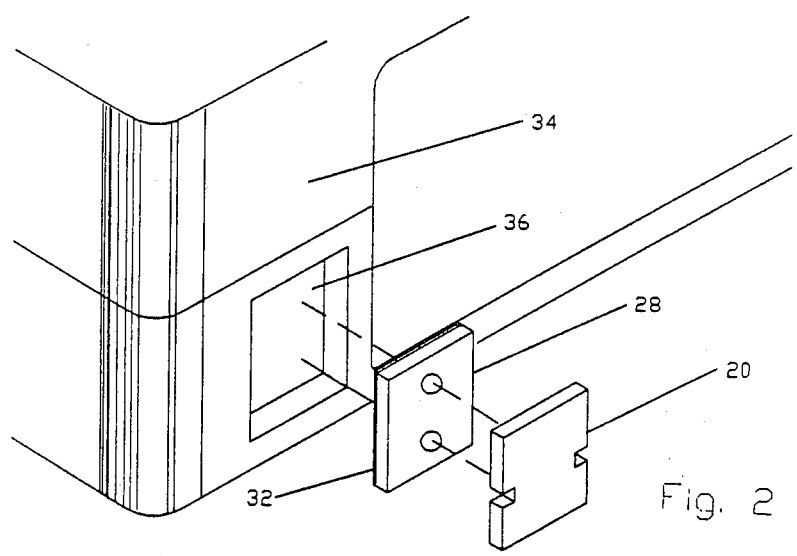
FIG. 2 shows an exploded isometric view of the device and the tape cassette cavity.
Figure 3:
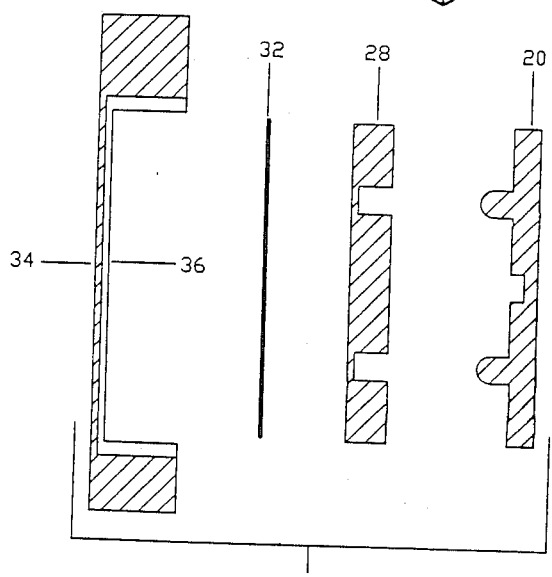
FIG. 3 shows a side section view of parts going into cavity.
Figure 4:
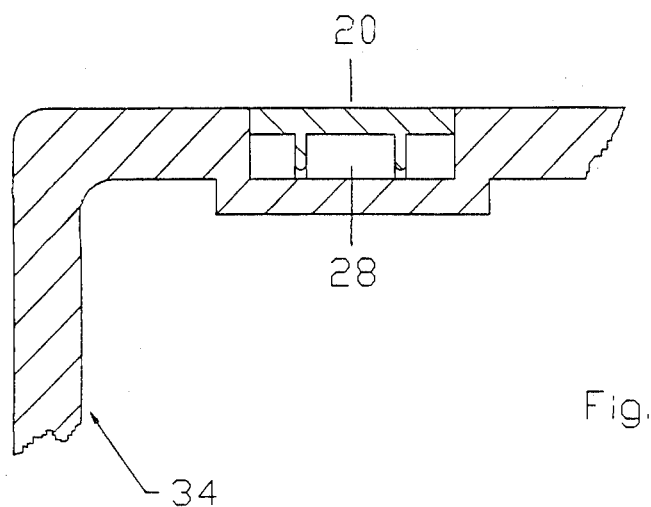
FIG. 4 shows sectional view of tape cassette with both parts (20 and 28) together in cavity.
Figure 5:
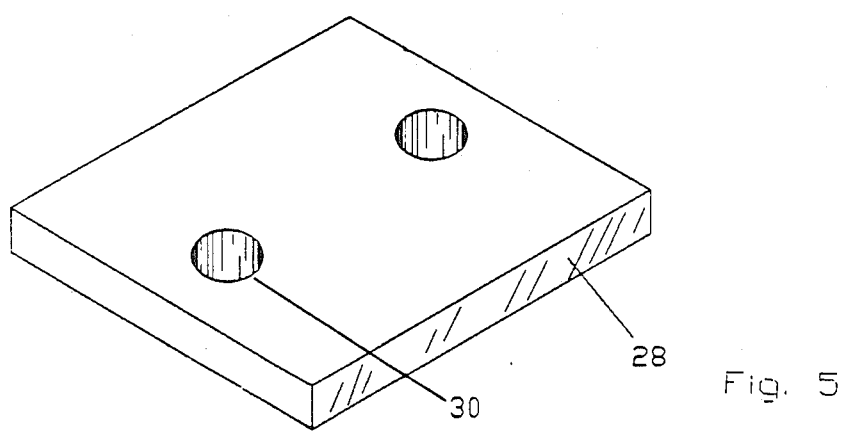
FIG. 5 shows an isometric view of the female (static) part, showing the two round cylindrical cavities.

DRAWING REFERENCE NUMERALS 20 removable part (male)
22 cylindrical members
24 slot
26 recess
28 static part (female)
30 through holes
32 double-sided (or "stick") tape
34 VHS format tape cassette
36 VHS tape cavity (with safety tab removed)
38 removal tool handle
40 removal tool jaws
42 removal tool
48 single jaw assembly
52 jaw
54 tang Part—Description FIG. 4 shows the static (female) part 28 according to the preferred embodiment of the invention. The part is comprised of a molded red colored plastic square measuring approximately 0.370" on each side, and measuring approximately 0.075" thick. Two through-holes as shown in FIG. 5 would have a diameter of such size as to accept the molded plastic members of the removable part 20 in a friction fit. Affixed to the bottom would be two-sided or double stick tape, as shown in FIGS. 2 and 3.

FIG. 7 shows the removable (male) part 20 according to the preferred embodiment of the invention. The part is comprised of a molded green colored plastic square measuring approximately 0.370" on each side and measuring approximately 0.040" thick. The two molded cylindrical members would have a diameter consistent with through-holes 30 in part 28 to allow acceptance by said part 20 by means of a friction fit, and should be of such length as not to extend through bottom of static part 28. Slot 24, FIG. 7, is of such size as to allow removal tool 42 to enter into slot 24 and upon squeezing together of handle 38, allow tool jaw to register in recess 26. Recess 26 is shown in sectional view of FIG. 8.

Single-piece Tool—Description

FIG. 9 shows a single piece tool 42 according to the preferred embodiment of the invention. The tool 42 is comprised of a handle 38 preferably made of molded resilient plastic which is shaped as pictured in FIG. 9 and is molded onto the tang 54 of the tools' jaws.

Figures 6A, 6B:
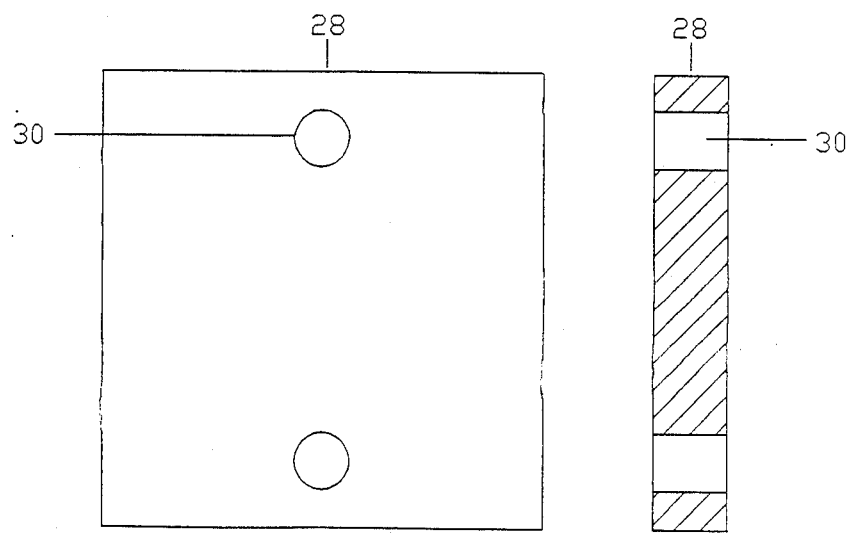
FIGS. 6a and 6b show a top and side sectional view of the female (static) part.
Figure 10:
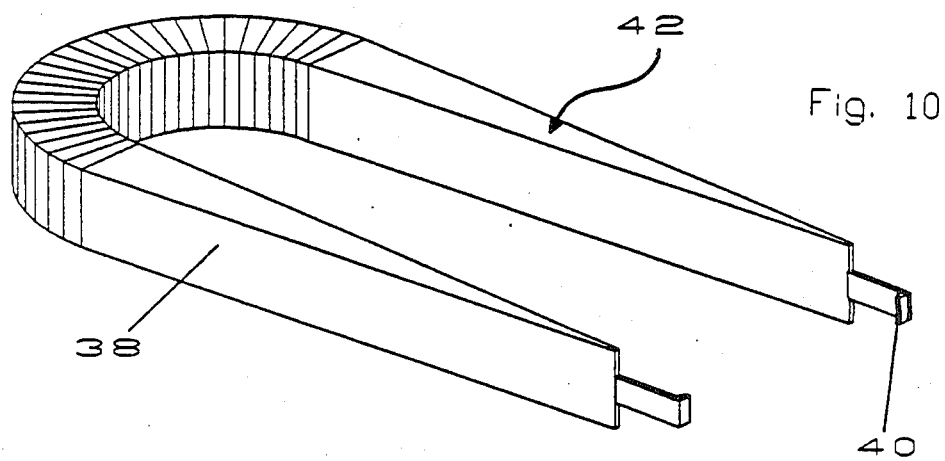
FIG. 10 shows an isometric view of the removal tool.
Figure 11:
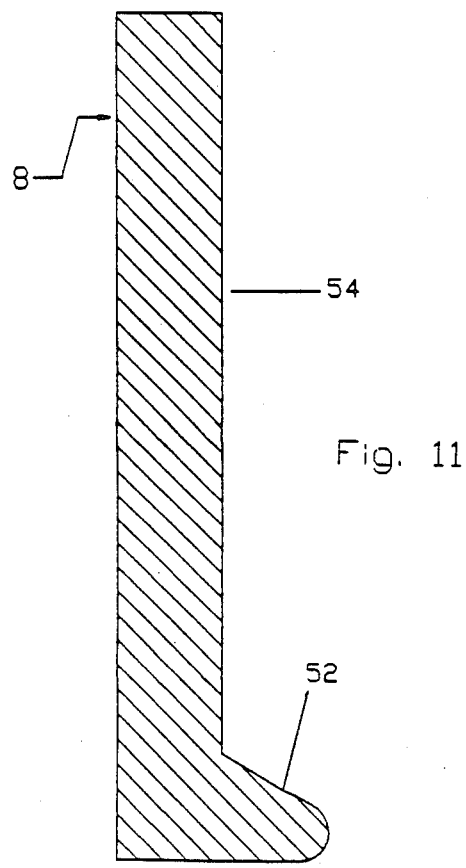
FIG. 11 shows a sectional view of removal tool jaw.

The handle should be of such length as to permit easy control and stability for the user, and should be tapered from apex of arc to tang 54 allowing a clean look and feel. Tools' jaws assembly 48 could be made of metal, or possibly a molded plastic. FIG. 11 is an isometric view of single jaw assembly 48 which shows tang 54, and jaw 52. In FIG. 11, jaw 52 would be of such size as to fit into slot 24 and then enter into recess 26, FIGS. 6 and 7. Jaw 52 should be of such thickness as to allow said jaw to become flush with underside of removable part 20.

Part—Operation

The device described below would perform a very simple task by allowing the users of VHS video tapes a positive "system" for both insuring against the possibility of recording over a tape by providing a solid alternative to the vinyl tape method the video tape recorder manufacturers suggest. It would also provide a neat, efficient system indicating at a glance whether the tape was able to be recorded on, or if it was program protected. This would be accomplished by using two different colored plastics in the manufacture of the parts. The static part 28 would be molded of bright red plastic, while the removable part 20 would be cast in a bright green plastic. When the removable part 20 was removed, it would expose the static part 28, which is colored bright red, the user would know at a glance that this meant it was not possible to record on the tape. On the other hand when the removable part 20 was replaced, user would be able to use the tape for recording purposes now indicated by 20s' bright green color.

The removable part 20 would align into the static part 28 by means of the cylindrical members 22 fitting into the corresponding through-holes 30, this would be the side opposite the double-sided tape 32. The parts would stay together by means of a friction fit. After removing the backing from the double-sided tape attached to the bottom of static part 28, the unit would be placed into the video tape cavity 36, FIG. 2 and FIG. 3, until the unit is seated against the back wall of the cavity 36. In this position the video tape would be able to accept a recording command from the user.

To protect a tape against accidentical erasure, insert any small pointed object, such as a nail file or small screw driver into either slot 24 in removable part 20 and pry up; or use the removal tool and insert jaws 52 into corresponding slots 24 in removable part 20, and squeeze firmly together and extract removable part.

The red static part 28 is now visible indicating video tape is now record-protected.

Figure 12:
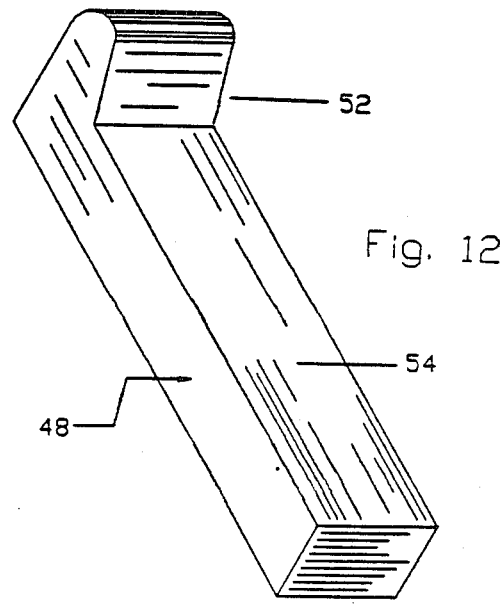
FIG. 12 shows an isometric view of removal tool jaw.

To use the device to record on tape, align extruding members of removable part 20 with corresponding through-holes 30 and push in until a flush fit with outside tape cassette cavity is obtained, as seen in FIG. 12.

While the above description contains many specificities, the reader should not construe these as limitations on the scope of the invention, but merely as exemplifications of preferred embodiments thereof. Those skilled in the art will envision many other possible variations are within its scope. For example parts 20, and 28 could be made of any non-magnetic material, providing they were of a hardness that would not fatigue under the pressure of the switch sensor on the video tape mechanism. Although desirable, for ease of detection, it is possible for aforementioned parts to be made of any color or colors, or to be transparent. Skilled artisans will readily be able to change the shapes of the various embodiments, for said switch sensor touches at approximate center of original break off safety tab on tape cassette housing. It is also possible for those skilled in the art to replace the two piece unit with more or less parts, and even eliminate tool 42, or find many possible variations as to removal and installation of unit.

We claim:

1. A device that will allow recording on a video tape cassette that has had its safety break-off tab removed, comprising:
   (a) a female part of such size as to be securable in a cassette break-off tab cavity by either an adhesive medium or by a friction fit wherein the thickness of said female part is small enough to prevent activation of a recording micro switch sensor in a video cassette recorder;
   (b) a male part of such thickness that when attached to said female part positions a switch contacting surface of said male part substantially flush with the outside of tape cassette housing;
   (c) said male part being attachable to said female part by means of an extruded member or plurality of members which fit into corresponding shaped cavities in said female part allowing the two parts to mate whereby said switch contacting surface of said male part is positioned to come in contact with the micro switch sensor and engage the sensor in an on position allowing tape to be able to receive recorded signals;
   (d) said male part being detachable from said female part to alternatively prevent recording on the cassette tape.

2. The parts of claim 1 being made of a plastic type material.

3. The parts of claim 1 being made of a rubber type material.

4. The parts of claim 1 could be of any shape as long as there was sufficient area to activate the switch sensor.

* * * * *